US012401013B2

(12) United States Patent
Lee et al.

(10) Patent No.: US 12,401,013 B2
(45) Date of Patent: Aug. 26, 2025

(54) ELECTRODE SLURRY COATING APPARATUS AND METHOD FOR FORMING DOUBLE ACTIVE MATERIAL LAYERS

(71) Applicant: LG Energy Solution, Ltd., Seoul (KR)

(72) Inventors: Taek Soo Lee, Daejeon (KR); Young Joon Jo, Daejeon (KR); Sang Hoon Choy, Daejeon (KR); Ki Tae Kim, Daejeon (KR); Ji Hee Yoon, Daejeon (KR); Cheol Woo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/387,741

(22) Filed: Nov. 7, 2023

(65) Prior Publication Data
US 2024/0079547 A1 Mar. 7, 2024

Related U.S. Application Data

(62) Division of application No. 17/278,919, filed as application No. PCT/KR2020/012451 on Sep. 16, 2020, now Pat. No. 11,862,782.

(30) Foreign Application Priority Data

Oct. 17, 2019 (KR) .................. 10-2019-0128891

(51) Int. Cl.
H01M 4/04 (2006.01)
B05C 5/02 (2006.01)
B05C 11/10 (2006.01)
H01M 10/0525 (2010.01)

(52) U.S. Cl.
CPC ......... *H01M 4/0404* (2013.01); *B05C 5/0275* (2013.01); *B05C 11/1005* (2013.01); *B05C 11/1018* (2013.01); *H01M 10/0525* (2013.01)

(58) Field of Classification Search
CPC ...................................... H01M 4/04
See application file for complete search history.

(56) References Cited

U.S. PATENT DOCUMENTS 5,700,325 A 12/1997 Watanabe
5,728,430 A 3/1998 Sartor et al.
5,962,075 A 10/1999 Sartor et al.
(Continued)

FOREIGN PATENT DOCUMENTS

CN 1846875 A 10/2006
CN 101171709 A 4/2008
(Continued)

OTHER PUBLICATIONS

International Search Report for Application No. PCT/KR2020/012451 dated Jan. 5, 2021, 2 pgs.
(Continued)

*Primary Examiner* — Austin Murata
(74) *Attorney, Agent, or Firm* — Lerner David LLP

(57) ABSTRACT

The present invention relates to electrode slurry coating apparatus and method, the present invention ultimately allowing the process efficiency to be increased and rate of errors to be reduced when double-layer structured active material layers are formed by temporally adjusting the height of first and second discharge outlets through which active material is discharged.

6 Claims, 3 Drawing Sheets

(56) References Cited

U.S. PATENT DOCUMENTS

| | | | |
|---|---|---|---|
| 2002/0176945 A1* | 11/2002 | Hudson | B05D 1/265 |
| | | | 427/407.1 |
| 2004/0247794 A1 | 12/2004 | Tokimasa et al. | |
| 2006/0000470 A1 | 1/2006 | Clarke et al. | |
| 2007/0026312 A1* | 2/2007 | Imachi | H01M 4/1391 |
| | | | 429/231.95 |
| 2009/0098277 A1 | 4/2009 | Okawa et al. | |
| 2012/0313274 A1 | 12/2012 | Loukusa et al. | |
| 2013/0299613 A1 | 11/2013 | Yang | |
| 2013/0313745 A1 | 11/2013 | Ikushima | |
| 2014/0023921 A1 | 1/2014 | Lee et al. | |
| 2018/0050365 A1 | 2/2018 | Son et al. | |
| 2018/0175365 A1 | 6/2018 | Ueda et al. | |
| 2018/0345310 A1 | 12/2018 | Watanabe et al. | |
| 2019/0351446 A1 | 11/2019 | Lee et al. | |
| 2020/0144657 A1 | 5/2020 | Kifune et al. | |
| 2020/0185696 A1 | 6/2020 | Lee et al. | |
| 2020/0295345 A1 | 9/2020 | Hirai et al. | |

FOREIGN PATENT DOCUMENTS

| | | | |
|---|---|---|---|
| CN | 103391820 A | 11/2013 | |
| CN | 103828092 A | 5/2014 | |
| CN | 107615523 A | 1/2018 | |
| CN | 107912025 A | 4/2018 | |
| CN | 110049824 A | 7/2019 | |
| JP | 2001170543 A | 6/2001 | |
| JP | 2001345096 A | 12/2001 | |
| JP | 2003112101 A | 4/2003 | |
| JP | 2005116284 A | 4/2005 | |
| JP | 2015100786 A | 6/2015 | |
| JP | 2016147216 A | 8/2016 | |
| JP | 2017170312 A | 9/2017 | |
| KR | 20120108484 A | 10/2012 | |
| KR | 101641095 B1 | 7/2016 | |
| KR | 20170126463 A | 11/2017 | |
| KR | 20180050243 A | 5/2018 | |
| KR | 20190019827 A | 2/2019 | |
| KR | 20190084471 A | 7/2019 | |
| WO | 2019038970 A1 | 2/2019 | |

OTHER PUBLICATIONS

Extended European Search Report including Written Opinion for Application No. 20864336.1 dated Jun. 28, 2021, 13 pages.

Search Report dated Jan. 30, 2022 from the Office Action for Chinese Application No. 202080005130.8 dated Feb. 14, 2022.

* cited by examiner

ELECTRODE SLURRY COATING APPARATUS AND METHOD FOR FORMING DOUBLE ACTIVE MATERIAL LAYERS

CROSS-REFERENCE TO RELATED APPLICATIONS

This application is a divisional of U.S. application Ser. No. 17/278,919, filed on Mar. 23, 2021, which is a national phase entry under 35 U.S.C. § 371 of International Application No. PCT/KR2020/012451, filed on Sep. 16, 2020, which claims priority to Korean Patent Application No. 10-2019-0128891, filed on Oct. 17, 2019, the disclosures of which are herein incorporated by reference in their entirety.

TECHNICAL FIELD

The present invention relates to an electrode slurry coating apparatus and method for forming an active material layer having a double layer structure.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel. In order to be applied as an energy source of an electric vehicle, a high-power battery is required.

In order to improve the performance of a secondary battery, the development of an electrode structure in which active material layers having a two-layer structure are formed on a current collector is drawing attention. A method of forming the two-layered active material layers on the current collector is to sequentially coat the slurry forming the lower and upper active material layers on the current collector in the form of a thin metal film. However, when the slurry forming the lower and upper active material layers is discharged at a time, the lower and upper active materials are mixed with each other, so that a desired double-layer structure cannot be formed.

Therefore, when manufacturing an electrode having a double layer structure of an active material, there is a need to develop a technology capable of effectively forming an active material layer having a double layer structure in the electrode slurry coating process.

DISCLOSURE

Technical Problem

The present invention was invented to solve the above problems, and an object of the present invention is to provide an electrode slurry coating apparatus and method for forming an active material layer having a double layer structure with improved process efficiency.

Technical Solution

An electrode slurry coating apparatus 130 composed of a lower plate 131, a middle plate 132, and an upper plate 133 according to the present invention includes: a first discharge port 110 formed between the lower plate 131 and the middle plate 132 and for discharging the slurry forming a lower slurry layer onto a current collector; a second discharge port 120 formed between the middle plate 132 and the upper plate 133, positioned to be spaced apart from the first discharge port in the downstream direction in the coating direction, and for discharging the slurry forming an upper slurry layer onto the lower slurry layer on the current collector; and a movement controller for moving the coating apparatus in a direction opposite to the discharge direction.

In the present invention, the ends of the lower plate, the middle plate, and the upper plate are located on the same straight line.

In one embodiment, the movement controller controls the shortest distance H1 between the end of the coating apparatus and the current collector to satisfy the following condition:

Condition

When a certain time elapses after forming the lower slurry layer, the apparatus is moved in an opposite direction to the discharge direction to form an upper slurry layer on the lower slurry layer, and at this time, its moved distance $H_{1T}$ is in a range of 60 to 140% of an average thickness of the upper slurry layer.

If the above range is less than 60%, compared to the amount of liquid discharged, the space where the slurry stays to be coated, that is, the total area between the end of the coating apparatus and the lower slurry layer, is insufficient, so that the supplied slurry cannot be coated and leaks back. On the other hand, in the case of more than 140%, compared to the supplied slurry, the coating area is too large, so that the coating may not be evenly performed, or only the lower layer may be coated and the upper layer may not be coated.

In another example, the time point at which the coating apparatus moves in a direction opposite to the discharge direction can be calculated by the following Formula 1.

movement switching point ($T_{dS}$, sec)=(thickness ($a$) of middle plate (mm)+thickness ($b$) of first discharge port (mm))/moving speed (mm/sec) of current collector in the moving direction (MD).   Formula 1

In a specific example, a shortest distance ($H_{1S}$) between an end of the apparatus and the current collector before starting electrode slurry coating is in a range of 60 to 140% of an average thickness of the lower slurry layer.

If the above range is less than 60%, compared to the amount of liquid discharged, the space where the slurry stays to be coated, that is, the total area between the end of the coating apparatus and the current collector, is insufficient, so that the supplied slurry cannot be coated and leaks back. On the other hand, when it exceeds 140%, compared to the supplied slurry, the coating area becomes too large, resulting in a phenomenon in which coating is not evenly performed.

In addition, the average thickness of each of the upper and lower slurry layers is 40 to 200 μm.

Typically, the average particle diameter of the secondary battery active material is around 10 μm, but since the particle diameter follows a normal distribution, d(90) or d(max) is generally greater than 10 μm. In order to achieve good coating, in the present invention, the coating apparatus is moved in the opposite direction to the discharge direction to form the upper slurry layer. At this time, when the average thickness of the upper slurry layer is less than 40 μm, the moving distance $H_{1T}$ is a value between 24 μm and 56 μm. In this case, as the moving distance $H_{1T}$ becomes closer to d (max), when the upper active material is coated, the moving distance $H_{1T}$ with the active material having the maximum particle diameter becomes close, and when the active material contained in the slurry is coated, there may be a phenomenon in which it is not possible to pass a height that is as high as $H_{1T}$. It is because this may cause defects in the coating surface, for example, a situation that a line is formed on the coating surface because a large active material is caught, and it is caught between the moving current collector and the coating end and damages the current collector, thereby causing a rupture phenomenon of the current collector.

In addition, if the thickness of the slurry layer is 200 μm or more, it may be advantageous, but there is a problem that it is difficult to achieve realistically to exceed 200 μm coating amount actually used for the secondary battery.

In addition, the present invention a further includes: a first valve configured to open and close a discharge of the first discharge port; a second valve configured to open and close a discharge of the second discharge port; and a valve controller configured to control opening and closing of the first and second valves.

In a specific example, when the electrode slurry coating ends, the valve controller sets the closing time of the second valve to be delayed by a closing delay time according to Formula 2 below from the closing time of the first valve.

Upper slurry discharge closing delay time $(T_{dT}, \text{sec})$=(thickness ($a$) of middle plate (mm)+ thickness ($b$) of first discharge port (mm))/moving speed (mm/sec) of current collector in the moving direction (MD). Formula 2

For example, the electrode slurry coating apparatus is a positive electrode slurry coating apparatus for a secondary battery.

The present invention also provides an electrode slurry coating method using the electrode slurry coating apparatus described above.

A method of coating an electrode slurry according to the present invention includes: forming a lower slurry layer by discharging a slurry through a first discharge port on a current collector moving in a coating direction (MD) by using an apparatus 130 for coating an electrode slurry, composed of a lower plate 131, a middle plate 132 and a upper plate 133; moving the apparatus in a direction opposite to the discharge direction; and forming an upper slurry layer by discharging a slurry through a first discharge port and a second discharge port positioned to be spaced from a downstream side in a coating direction, on a lower slurry layer, wherein ends of the lower plate, the middle plate, and the upper plate are located on a same straight line.

In one example, the time point at which the coating apparatus moves in a direction opposite to the discharge direction can be calculated by the following Formula 1.

movement switching point $(T_{dS}, \text{sec})$=(thickness ($a$) of middle plate (mm)+thickness ($b$) of first discharge port (mm))/moving speed (mm/sec) of current collector in the moving direction (MD). Formula 1

In another specific example, the electrode slurry coating method according to the present invention starts discharging the slurry through the first discharge port when coating the electrode slurry, and when the coating apparatus moves in a direction opposite to the discharge direction, slurry discharge is started through the second discharge port.

For example, a shortest distance ($H_{1S}$) between an end of the apparatus and the current collector before starting electrode slurry coating is in a range of 60 to 140% of an average thickness of the lower slurry layer.

If the above range is less than 60%, compared to the amount of liquid discharged, the space where the slurry stays to be coated, that is, the total area between the end of the coating apparatus and the current collector, is insufficient, so that the supplied slurry cannot be coated and leaks back. On the other hand, when it exceeds 140%, compared to the supplied slurry, the coating area becomes too large, resulting in a phenomenon in which coating is not evenly performed.

In another example, the electrode slurry coating method according to the present invention is characterized in that, at the end of the electrode slurry coating, the discharge stop time of the slurry forming the upper slurry layer is delayed by the valve closing delay time according to Formula 2 below than the discharge stop time of the slurry forming the lower slurry layer.

Upper slurry discharge closing delay time $(T_{dT}, \text{sec})$=(thickness ($a$) of middle plate (mm)+ thickness ($b$) of first discharge port (mm))/moving speed (mm/sec) of current collector in the moving direction (MD). Formula 2

In addition, the distance difference between the coating end point of the upper slurry layer and the coating end point of the lower slurry layer according to the discharge delay of the present invention is preferably within 3 mm.

In addition, the ratio of the average thickness ($D_1$) of the lower slurry layer and the average thickness ($D_2$) of the upper slurry layer of the present invention is 1:3 to 3:1.

The thickness of the slurry layer as described above can be seen as the pressure of the immediately supplied slurry. In the case that the pressure of the upper slurry layer is supplied in excess of 3 times the pressure of the lower slurry layer so that the thickness ratio of the lower slurry layer and the upper slurry layer is 1:3 or more, since the upper layer has stronger pressure than the lower layer, the lower layer slurry is pushed back in the opposite direction to the coating direction, thereby increasing the possibility of leakage, and the lower slurry may not be supplied properly due to the strong pressure of the upper slurry. In addition, due to the high pressure of the upper slurry, the supply of the slurry to the lower slurry layer is not uniform, so that it is difficult to form the lower slurry layer uniformly.

On the other hand, when the pressure of the lower slurry layer is supplied in excess of 3 times the pressure of the upper slurry layer so that the thickness ratio of the lower slurry layer and the upper slurry layer is 3:1 or more, there is a problem that the supply of the upper slurry layer may become difficult, or the coating of the upper slurry layer may be pushed in the coating direction, and the surface of the coating liquid may be uneven.

Advantageous Effects

The electrode slurry coating apparatus and method according to the present invention can increase process efficiency and reduce defect rates when forming an active material layer having a double-layer structure on a current collector. In addition, it is possible to reduce the electrode area discarded after the process by reducing the loading off section.

DETAILED DESCRIPTION OF THE PREFERRED EMBODIMENTS

Figure 1:
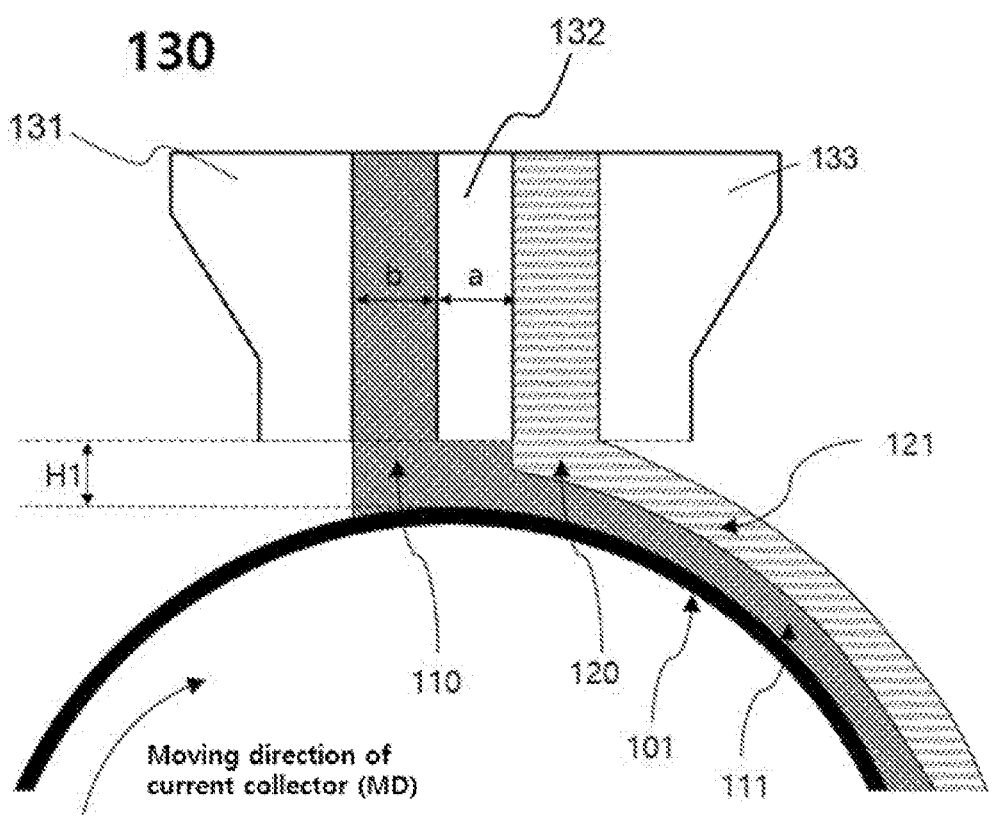
FIG. 1 is a schematic diagram showing an active material slurry coating process using an electrode slurry coating apparatus according to an embodiment of the present invention.

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In the present invention, "coating end" means not only the case of terminating the electrode slurry coating, but also the case of temporarily stopping the slurry coating. Specifically, it includes the case of terminating or temporarily stopping the operation of the electrode slurry coating apparatus, for example, the case of repeating the progress and interruption of slurry coating to form a patterned active material layer, and the case of stopping the slurry coating.

In the present invention, "coating start" is meant to encompass not only the case of starting electrode slurry coating, but also the case of resuming the temporarily stopped slurry coating. Specifically, it includes the case of starting the operation of the electrode slurry coating apparatus or restarting the operation that has been temporarily stopped, for example, the case of repeating the progress and interruption of slurry coating to form a patterned active material layer, and the case of performing the slurry coating.

In addition, in the present invention, the "correspondence" of two specific points is meant to encompass cases where the two points are located on the same line or within a similar range thereof. The fact that the two points are located on the same line includes not only the case that they are physically located on the same line, but also a case that they exist within an error range of facility or measurement equipment or a range including a buffer area of a certain level.

In general, in manufacturing an electrode, slurry including an active material, a conductive material, and a binder is prepared, discharged onto a current collector to form a slurry layer, and finally, an active material layer (electrode layer) is formed through a drying process.

The present invention relates to an electrode slurry coating apparatus and a coating method for manufacturing an electrode having a double-layer active material layer.

First, the present invention relates to an electrode slurry coating apparatus 130 composed of a lower plate 131, a middle plate 132, and an upper plate 133, including: a first discharge port 110 formed between the lower plate 131 and the middle plate 132 and for discharging the slurry forming a lower slurry layer onto a current collector; a second discharge port 120 formed between the middle plate 132 and the upper plate 133, positioned to be spaced apart from the first discharge port in the downstream direction in the coating direction, and for discharging the slurry forming an upper slurry layer onto the lower slurry layer on the current collector; and a movement controller for moving the coating apparatus in a direction opposite to the discharge direction.

Characteristically, in the present invention, the ends of the lower plate, the middle plate, and the upper plate are located on the same straight line.

In one embodiment, the movement controller moves the electrode slurry coating apparatus so that the shortest distance H1 between the end of the coating apparatus and the current collector satisfies the following condition.

Condition

When a certain time elapses after forming the lower slurry layer, the coating apparatus is moved in the opposite direction to the discharge direction to form the upper slurry layer on the lower slurry layer. At this time, the moved distance $H_{1T}$ is in the range of 60 to 140% of the average thickness of the upper slurry layer. Preferably, the $H_{1T}$ is in the range of 60 to 120% or 60 to 100% of the average thickness of the upper slurry layer. The $H_{1T}$ provides a space in which the upper slurry layer is formed.

If the above range is less than 60%, compared to the amount of liquid discharged, the space where the slurry stays to be coated, that is, the total area between the end of the coating apparatus and the lower slurry layer, is insufficient, so that the supplied slurry cannot be coated and leaks back. On the other hand, in the case of more than 140%, compared to the supplied slurry, the coating area is too large, so that the coating may not be evenly coated, or only the lower layer may be coated and the upper layer may not be coated.

Accordingly, in the electrode slurry coating apparatus according to the present invention, the lower and upper slurry layers are not mixed, and the lower and upper slurry layers are then dried to stably form a two-layer structure composed of lower and upper active material layers.

In the present invention, the average thickness of the upper slurry layer is preferably 40 to 200 μm, more preferably 50 to 180 μm, and the average thickness of the lower slurry layer is 40 to 200 μm, more preferably 50 to 180 μm.

Typically, the average particle diameter of the secondary battery active material is around 10 μm, but since the particle diameter follows a normal distribution, d(90) or d(max) is generally greater than 10 μm. In order to achieve good coating, in the present invention, the coating apparatus is moved in the opposite direction to the discharge direction to form the upper slurry layer. At this time, when the average thickness of the upper slurry layer is less than 40 μm, the moving distance $H_{1T}$ is a value between 24 μm and 56 μm. In this case, as the moving distance $H_{1T}$ becomes closer to d (max), when the upper active material is coated, the moving distance $H_{1T}$ with the active material having the maximum particle diameter becomes close, and when the active material contained in the slurry is coated, there may be a phenomenon in which it is not possible to pass a height that is as high as $H_{1T}$. It is because this may cause defects in the coating surface, for example, a situation that a line is formed on the coating surface because a large active material is caught, and it is caught between the moving current collector and the coating end and damages the current collector, thereby causing a rupture phenomenon of the current collector.

In addition, if the thickness of the slurry layer is 200 μm or more, it may be advantageous, but there is a problem that it is difficult to achieve realistically to exceed 200 μm coating amount actually used for the secondary battery.

In addition, the time point at which the coating apparatus moves in the direction opposite to the discharge direction can be calculated by, for example, Formula 1 below.

Movement switching point ($T_{dS}$, sec)=(thickness ($a$) of middle plate (mm)+thickness ($b$) of first discharge port (mm))/moving speed (mm/sec) of current collector in the moving direction (MD).     Formula 1

In the electrode slurry coating apparatus according to the present invention, the height $H_1$, which is the shortest distance between the end of the coating apparatus and the current collector, is changed from $H_{1S}$ to $H_{1T}$ after the position (movement) change time calculated by Formula 1 above. Here, the shortest distance between the end of the coating apparatus and the current collector means the length from the straightened ends of the upper, middle and lower plates of the coating apparatus to a vertical tangent to the current collector.

This is to stably form an upper slurry layer on the lower slurry layer formed after the lower slurry layer is formed first.

In one example, the shortest distance ($H1_S$) between the current collector and the end of the coating apparatus before starting electrode slurry coating is controlled in the range of 60 to 140% of the average thickness of the lower slurry layer, preferably 80 to 120%, and more preferably 80 to 100%.

If the above range is less than 60%, compared to the amount of liquid discharged, the space where the slurry stays to be coated, that is, the total area between the end of the coating apparatus and the current collector, is insufficient, so that the supplied slurry cannot be coated and leaks back. On the other hand, when it exceeds 140%, compared to the supplied slurry, the coating area becomes too large, resulting in a phenomenon in which coating is not evenly performed.

Meanwhile, the slurry is discharged from the first discharge port to form a lower slurry layer, and the slurry is again discharged from the second discharge port on the formed lower slurry layer to form an upper slurry layer. In the present invention, the slurry discharged from the second discharge port is designed to pressurize the lower slurry layer to a certain level. Through this, interlayer interfacial bonding properties are improved, and air bubbles or the like are prevented from being formed at the interface.

In the present invention, the lower plate, the middle plate, and the ends of the upper plate are characterized in that they are located on the same straight line. In the present invention, the lower slurry layer is first formed through the first discharge port, and then the coating apparatus is moved in the opposite direction to the discharge direction after a certain time has elapsed, so that a space in which the upper slurry layer is formed is secured through the second discharge port.

In another example, an electrode slurry coating apparatus according to the present invention further includes: a first valve for opening and closing the discharge of the first discharge port; a second valve for opening and closing the discharge of the second discharge port; and a valve controller for controlling opening and closing of the first and second valves.

In addition, the valve controller opens the first valve when the electrode slurry coating starts, and opens the second valve when the coating apparatus moves in a direction opposite to the discharge direction. This is to first form a lower slurry layer by opening the first valve. When the formed lower slurry layer reaches the position of the second discharge port by the movement of the conveyor that moves the current collector, the second valve is opened at that time to stably form the upper slurry layer on the lower slurry layer. In addition, by controlling the opening timing of the first and second valves, the coating start points of the lower and upper slurry layers correspond to each other, and the area of the surplus portion discarded through this may be minimized.

In another example, for example, when the electrode slurry coating ends, the valve controller sets the closing time of the second valve to be delayed by a closing delay time according to Formula 2 below from the closing time of the first valve.

Upper slurry discharge closing delay time (sec)= (thickness ($a$) of middle plate (mm)+thickness ($b$) of first discharge port (mm))/moving speed (mm/sec) of current collector in the moving direction (MD). Formula 2

The closing delay time according to Formula 2 above is to minimize the area of the surplus portion at the end time point of coating within a range that does not impede the stable formation of the two-layered active material layer.

Through the valve closing delay as described above, the distance difference between the surplus portion, that is, the coating end point of the upper slurry layer and the coating end point of the lower slurry layer, is adjusted to be within 3 mm. This is because if the length of the surplus portion exceeds 3 mm as described above, the area to be discarded increases, which is not economical.

In another embodiment, the ratio of the average thickness ($D_1$) of the lower slurry layer formed by the slurry discharged through the first discharge port and the average thickness ($D_2$) of the upper slurry layer formed by the slurry discharged through the second discharge port is in the range of 1:3 to 3:1 ($D_1:D_2$). The thickness ratio is a relative average value of the length of each layer in the thickness direction.

The thickness of the slurry layer as described above can be seen as the pressure of the immediately supplied slurry. In the case that the pressure of the upper slurry layer is supplied in excess of 3 times the pressure of the lower slurry layer so that the thickness ratio of the lower slurry layer and the upper slurry layer is 1:3 or more, since the upper layer has stronger pressure than the lower layer, the lower layer slurry is pushed back in the opposite direction to the coating direction, thereby increasing the possibility of leakage, and the lower slurry may not be supplied properly due to the strong pressure of the upper slurry. In addition, due to the high pressure of the upper slurry, the supply of the slurry to the lower slurry layer is not uniform, so that it is difficult to form the lower slurry layer uniformly.

On the other hand, when the pressure of the lower slurry layer is supplied in excess of 3 times the pressure of the upper slurry layer so that the thickness ratio of the lower slurry layer and the upper slurry layer is 3:1 or more, there is a problem that the supply of the upper slurry layer may become difficult, or the coating of the upper slurry layer may be pushed in the coating direction, and the surface of the coating liquid may be uneven.

The present invention also provides an electrode slurry coating method using the apparatus described above. In the detailed description mentioned in the description of the apparatus or the specific numerical range limitation, the overlapping portion will be omitted in the description of the electrode slurry coating method below.

The method of coating an electrode slurry according to the present invention includes: forming a lower slurry layer by discharging a slurry through a first discharge port on a current collector moving in a coating direction (MD) by using an apparatus 130 for coating an electrode slurry, composed of a lower plate 131, a middle plate 132 and a upper plate 133; moving the apparatus in a direction opposite to the discharge direction; and forming an upper slurry layer by discharging a slurry through a first discharge port and a second discharge port positioned to be spaced from a downstream side in a coating direction, on a lower slurry layer.

In the present invention, the ends of the lower plate, the middle plate, and the upper plate are located on the same straight line.

In one example, in the electrode slurry coating method, the height (H1), which is the shortest distance between the end of the coating apparatus and the current collector, is changed from $H_{1S}$ to $H_{1T}$ at a point in time after a certain time elapses after the start of electrode slurry coating, and the $H_{1T}$ provides a space in which an upper slurry layer is formed. Accordingly, in the electrode slurry coating method according to the present invention, the lower and upper slurry layers are not mixed, and a two-layer structure composed of the lower and upper slurry layers is stably formed.

For example, the time point at which the coating apparatus moves in a direction opposite to the discharge direction can be calculated by the following Formula.

Movement switching point ($T_{dS}$, sec)=(thickness (a) of middle plate (mm)+thickness (b) of first discharge port (mm))/moving speed (mm/sec) of current collector in the moving direction (MD). Formula 1

In the electrode slurry coating method according to the present invention, the height ($H_1$) is changed from $H_{1S}$ to $H_{1T}$ after the movement conversion point calculated by Formula 1 above. This is to stably form an upper slurry layer on the lower slurry layer formed after the lower slurry layer is formed first.

In one example, the electrode slurry coating method according to the present invention starts discharging the slurry through the first discharge port when coating the electrode slurry, and when the coating apparatus moves in a direction opposite to the discharge direction, slurry discharge is started through the second discharge port.

Through this, when the formed lower slurry layer reaches the position of the second discharge port by the movement of the conveyor that moves the current collector, the second valve is opened at that time to stably form the upper slurry layer on the lower slurry layer. In addition, by controlling the opening timing of the first and second valves like the above, the coating start points of the lower and upper slurry layers correspond to each other, and the area of the surplus portion discarded through this may be minimized.

In another example, in one example, the shortest distance ($H1_S$) between the current collector and the end of the coating apparatus before starting electrode slurry coating is controlled in the range of 60 to 140% of the average thickness of the lower slurry layer, preferably 80 to 120%, and more preferably 80 to 100%. If the above range is less than 60%, compared to the amount of liquid discharged, the space where the slurry stays to be coated, that is, the total area between the end of the coating apparatus and the current collector, is insufficient, so that the supplied slurry cannot be coated and leaks back. On the other hand, in the case of more than 140%, compared to the supplied slurry, the coating area is too large, so that the coating may not be evenly performed, or only the lower layer may be coated and the upper layer may not be coated.

Here, the shortest distance between the end of the coating apparatus and the current collector means the length from the straightened ends of the upper, middle and lower plates of the coating apparatus to a vertical tangent to the current collector.

The slurry is discharged from the first discharge port to form a lower slurry layer, and the slurry is again discharged from the second discharge port on the formed lower slurry layer to form an upper slurry layer. In the present invention, the slurry discharged from the second discharge port is designed to pressurize the lower slurry layer to a certain level. Through this, interlayer interfacial bonding properties are improved, and air bubbles or the like are prevented from being formed at the interface.

In another example, the electrode slurry coating method according to the present invention is characterized in that, at the end of the electrode slurry coating, the discharge stop time of the slurry forming the upper slurry layer is delayed by the valve closing delay time according to Formula 2 below than the discharge stop time of the slurry forming the lower slurry layer.

Upper slurry discharge closing delay time (sec)= (thickness (a) of middle plate (mm)+thickness (b) of first discharge port (mm))/moving speed (mm/sec) of current collector in the moving direction (MD). Formula 2

The closing delay time according to Formula 2 above is to minimize the area of the surplus portion at the end time point of coating within a range that does not impede the stable formation of the two-layered active material layer.

The surplus portion as described above is referred to as the loading off section, which means a section from the point at which the thickness of the slurry layer is reduced by stopping the discharge of the slurry, to the end of the discharged slurry.

Through this, it is possible to show an effect of reducing the surplus portion that is discarded as the loading off section is caused. This leads to an increase in process efficiency and a decrease in manufacturing cost. The loading off section means a section from the point at which the thickness of the slurry layer is reduced by stopping the discharge of the slurry, to the most end (end portion) of the discharged slurry. In general, when the discharge closing is not delayed or is delayed too much, it is common that a loading off section of 5.5 mm or more occurs.

Through the slurry discharge delay in the upper slurry layer as described above, the distance difference between the surplus portion, that is, the coating end point of the upper slurry layer and the coating end point of the lower slurry layer, is adjusted to be within 3 mm. This is because if the length of the surplus portion exceeds 3 mm as described above, the area to be discarded increases, which is not economical.

Figure 3:
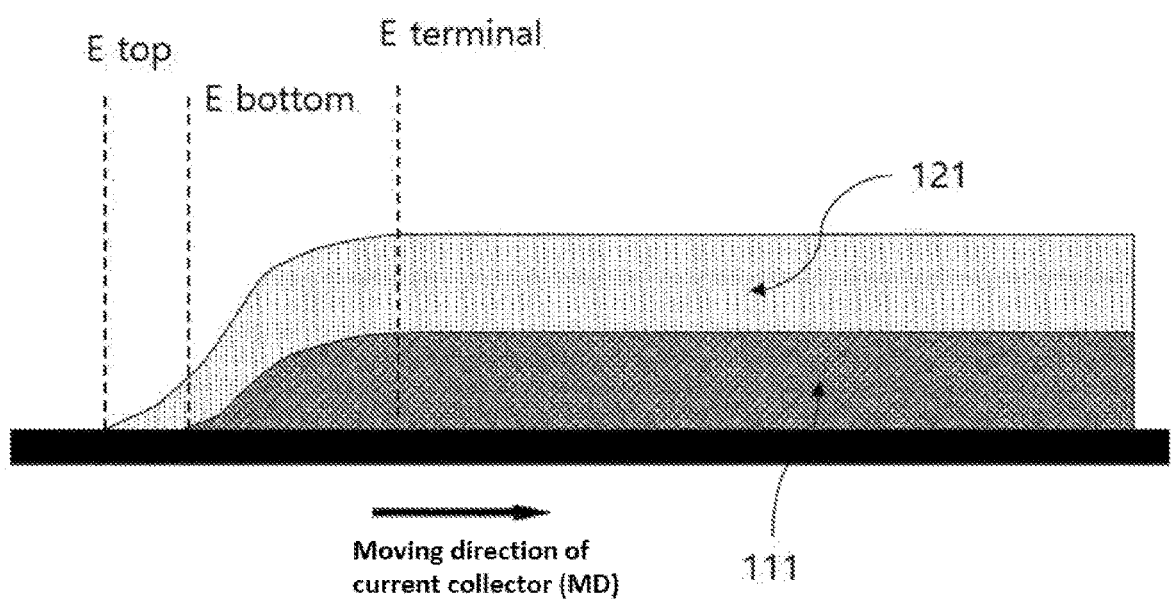
FIG. 3 is a schematic view showing a cross section of an electrode manufactured according to the electrode slurry coating method according to an embodiment of the present invention.

FIG. 3 shows a case in which the lower slurry layer 111 and the upper slurry layer 121 are sequentially coated on a current collector moving in the coating direction MD by a conveyor and are terminated. By delaying the discharge of the slurry from the upper slurry layer as described above, the distance difference between the coating end point (E bottom) of the lower slurry layer 111 and the coating end point (E top) of the upper slurry layer 121 can be reduced.

In addition, it is possible to reduce the length of the surplus portion compared to the prior art by delaying the discharge of the slurry in the upper slurry layer as described above. Here, the loading off section means the total distance from the portion where the thickness of the slurry layer starts to decrease (E terminal) to the end (E top) of the slurry.

In the present invention, while the E bottom and E top coincide, the length of the loading off section is reduced at the same time.

In another embodiment, the ratio of the average thickness ($D_1$) of the lower slurry layer formed by the slurry discharged through the first discharge port and the average thickness ($D_2$) of the upper slurry layer formed by the slurry discharged through the second discharge port is in the range of 1:3 to 3:1 ($D_1$:$D_2$). The thickness ratio is a relative average value of the length of each layer in the thickness direction.

Hereinafter, the present invention will be described in more detail through drawings and examples.

Figure 2:
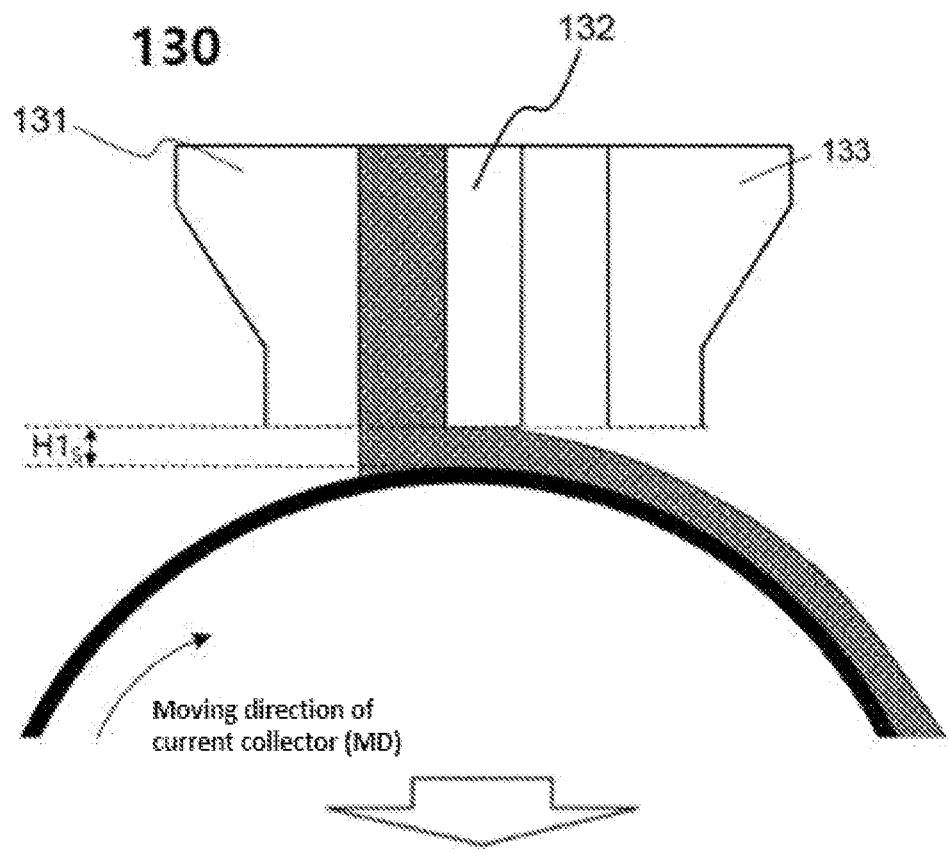
FIG. 2 is a schematic diagram showing an electrode slurry coating method according to an embodiment of the present invention.
Figure 2:
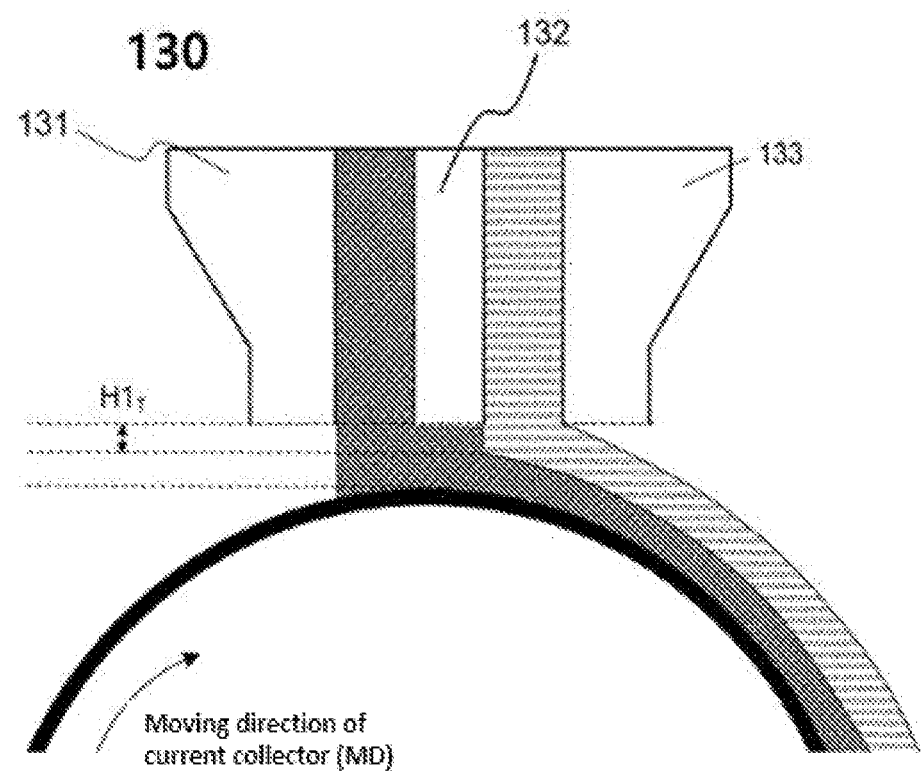

FIGS. 1 and 2 are schematic diagrams showing an active material slurry coating process using an electrode slurry coating apparatus according to an embodiment of the present invention. Referring to FIG. 1, the electrode slurry coating apparatus includes a lower plate 131 and an upper plate 133, and a middle plate 132 is interposed between the lower plate 131 and the upper plate 133. A slurry including an active material, a conductive material, and a binder fluidly moves along a flow path between the lower plate and the middle plate 131 and 132, and the slurry forming the lower slurry layer 111 is discharged through the first discharge port 110. A slurry including an active material, a conductive material, and a binder fluidly moves along the flow path between the middle plate and the upper plates 132 and 133, and the slurry forming the upper slurry layer 121 is discharged through the second discharge port 120. In addition, a conveyor (not shown) for moving the current collector 101 in the coating direction MD is located spaced apart from the first and second discharge ports 110 and 120 by a predetermined distance.

At this time, the ends of the lower plate, the middle plate and the upper plate of the coating apparatus are located on the same straight line.

In addition, referring to FIG. 2, in the coating apparatus, the ends of the apparatus, that is, the ends of the lower plate, the middle plate, and the upper plate are spaced apart from the current collector 101 by a predetermined distance. Herein, it is spaced apart before the start of coating by the shortest distance $H_{1S}$ between the end of the coating apparatus and the current collector.

The slurry discharged through the first discharge port 110 forms a lower slurry layer 111 having an average thickness $D_1$ on the current collector 101 and makes the coating apparatus to be separated from the current collector by a predetermined distance through a movement controller (not shown) that moves the coating apparatus in a direction opposite to the discharge direction. Thereafter, the slurry discharged through the second discharge port 120 forms an upper slurry layer 121 having an average thickness $D_2$ on the lower slurry layer 111.

First Embodiment

A positive electrode for a lithium secondary battery was manufactured through the electrode slurry coating apparatus and method shown in FIG. 1. Specifically, when starting electrode slurry coating, the shortest distance $H_{1S}$ between the surface of the current collector 101 moving along the conveyor and the end of the coating apparatus is 80 μm. The slurry is discharged from the first discharge port 110 to form a lower slurry layer. Then, the height $H_1$ of the coating apparatus is moved in the opposite direction to the discharge direction by $H_{1S}$ to $H_{1T}$ as shown in FIG. 2. The time point at which the coating apparatus moves is calculated by Formula 1 below. Specifically, the moving speed of the current collector 101 by the conveyor was 50 m/min, the thickness (a) of the middle plate was 1 mm, and the thickness (b) of the first discharge port was also 1 mm. Applying this to Formula 1 is as follows.

Movement switching point ($T_{dS}$, sec)=(thickness of middle plate (mm)+thickness of first discharge port (mm))/moving speed (mm/sec) of current collector in the moving direction (MD).  Formula 1

The sum of the thickness of the middle plate and the thickness of the first discharge port is 2 mm. In addition, moving speed (mm/sec) of the current collector 101 in the moving direction (MD) by the conveyor is 50 (m/min), that is, 83.3 (mm/sec). If calculated according to Formula 1, the travel time ($T_{dT}$) is $2.4 \times 10^{-3}$ (sec), that is, 2.4 ms (milliseconds).

$H_{1T}$, which is the distance the coating apparatus was moved in the direction opposite to the discharge direction during the above time, was 60 μm.

The overall average thickness (DT) of the slurry double layer coated by the electrode slurry coating apparatus is about 150 μm. Among them, the average thickness of the lower slurry layer D1 is 90 μm, and the average thickness of the upper slurry layer D2 is 60 μm.

Second Embodiment

A positive electrode for a lithium secondary battery was prepared using the electrode slurry coating apparatus shown in FIG. 1. A detailed description of the electrode slurry coating method is omitted since it overlaps with the first embodiment.

However, $H_{1T}$, the distance by which the coating apparatus was moved in the opposite direction to discharge direction, which was the starting distance, was 90 μm.

The overall average thickness (DT) of the slurry double layer coated by the electrode slurry coating apparatus is about 180 μm. Among them, the average thickness of the lower slurry layer D1 is 90 μm, and the average thickness of the upper slurry layer D2 is 90 μm.

Third Embodiment

A positive electrode for a lithium secondary battery was prepared using the electrode slurry coating apparatus shown in FIG. 1. A detailed description of the electrode slurry coating method is omitted since it overlaps with the first embodiment.

However, at the end of the electrode slurry coating, the closing time of the second valve was delayed by the closing delay time according to Formula 2 below from the closing time of the first valve. Specifically, the moving speed of the current collector 101 by the conveyor was 50 m/min, the thickness (a) of the middle plate was 1 mm, and the thickness (b) of the first discharge port was also 1 mm. Applying this to Formula 2 is as follows.

Upper slurry discharge closing delay time (sec)= (thickness (a) of middle plate (mm)+thickness (b) of first discharge port (mm))/moving speed (mm/sec) of current collector in the moving direction (MD).  Formula 2

The sum of the thickness of the middle plate and the thickness of the first discharge port is 2 mm. In addition, moving speed (mm/sec) of the current collector 101 in the moving direction (MD) by the conveyor is 50 (m/min), that is, 83.3 (mm/sec). If calculated according to Formula 2, the valve closing delay time is $2.4 \times 10^{-3}$ (sec) or 2.4 ms (milliseconds).

Therefore, at the end of the electrode slurry coating, the closing time of the second valve was delayed by 2.4 ms from the closing time of the first valve. In this case, in the manufactured electrode, the coating end points of the lower and upper slurry layers 111 and 121 were identical (E top=E bottom), and as a result of measuring the loading off length, which is the distance from the portion (E terminal) where the thicknesses of the upper and lower slurry layers are reduced to the end portion (E top, E bottom) where the coating is finished, it was formed as 4.5 mm.

In general, the loading off length is formed to be 5.5 mm or more, and in the case of manufacturing according to the third embodiment, a portion to be discarded is saved by reducing the length of the surplus portion, thereby increasing the efficiency of the process.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

101: current collector
110: first discharge port
111: lower slurry layer
120: second discharge port
121: upper slurry layer
131: lower plate of coating apparatus
132: middle plate of coating apparatus
133: upper plate of coating apparatus
a: thickness of the middle plate
b: thickness of the first discharge port

The invention claimed is:

1. An apparatus for coating an electrode slurry, the apparatus comprising:
a lower plate,
  a middle plate,
  an upper plate,
a first discharge port formed between the lower plate and the middle plate and configured to discharge a slurry forming a lower slurry layer onto a current collector;
a second discharge port formed between the middle plate and the upper plate, positioned to be spaced apart from the first discharge port in a downstream direction in a coating direction, and configured to discharge a slurry forming an upper slurry layer onto the lower slurry layer on the current collector; and
the coating apparatus configured to calculate a time point and move at the time point in a direction opposite to a discharge direction,
wherein ends of the lower plate, the middle plate, and the upper plate are located on a same straight line,
wherein when an electrode slurry coating is started, the slurry is discharged through the first discharge port, and
wherein when the apparatus moves in a direction opposite to the discharge direction, the slurry is discharged through the second discharge port,
wherein the time point at which the apparatus moves in the direction opposite to the discharge direction is calculated by the following Formula 1: the time point (sec)=(thickness ($a$) of the middle plate (mm)+thickness ($b$) of the first discharge port (mm))/moving speed (mm/sec) of the current collector in a moving direction (MD)  Formula 1.

2. The apparatus of claim 1, wherein the coating apparatus is configured to control a shortest distance H1 between an end of the apparatus and a current collector to satisfy a following condition:
Condition
when the time point elapses after forming the lower slurry layer, the apparatus is moved in an opposite direction to the discharge direction to form the upper slurry layer on the lower slurry layer, and at this time, its moved distance $H_{1T}$ is in a range of 60 to 140% of an average thickness of the upper slurry layer.

3. The apparatus of claim 1, wherein a shortest distance ($H_{1S}$) between an end of the apparatus and the current collector before starting electrode slurry coating is in a range of 60 to 140% of an average thickness of the lower slurry layer.

4. The apparatus of claim 1, wherein an average thickness of the upper and lower slurry layers is 40 to 200 μm.

5. The apparatus of claim 1, further comprising: a first valve configured to open and close a discharge of the first discharge port;
a second valve configured to open and close a discharge of the second discharge port; and
the coating apparatus configured to control opening and closing of the first and second valves.

6. The apparatus of claim 5, wherein when the electrode slurry coating ends, the coating apparatus is configured to delay closing time of the second valve by closing delay time according to Formula 2 below from closing time of the first valve: closing delay time ($T_{dT}$, sec)=(thickness ($a$) of middle plate (mm)+thickness ($b$) of first discharge port (mm))/moving speed (mm/sec) of current collector in the moving direction (MD)  Formula 2.

* * * * *